US012220912B2

(12) United States Patent
Owa

(10) Patent No.: US 12,220,912 B2
(45) Date of Patent: Feb. 11, 2025

(54) PRINTING APPARATUS, DISPLAY METHOD, AND DISPLAY SYSTEM

(71) Applicant: SEIKO EPSON CORPORATION, Tokyo (JP)

(72) Inventor: Masahiro Owa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 99 days.

(21) Appl. No.: 17/930,073

(22) Filed: Sep. 7, 2022

(65) Prior Publication Data

US 2023/0074947 A1 Mar. 9, 2023

(30) Foreign Application Priority Data

Sep. 9, 2021 (JP) ................................ 2021-146816

(51) Int. Cl.
*B41J 2/045* (2006.01)

(52) U.S. Cl.
CPC ......... *B41J 2/0451* (2013.01); *B41J 2/04586* (2013.01)

(58) Field of Classification Search
CPC .. B41J 2/0451; B41J 2/04571; B41J 2/04581; B41J 2/04586; B41J 2/16535; B41J 2/16579; B41J 2002/14354
See application file for complete search history.

(56) References Cited

U.S. PATENT DOCUMENTS 6,224,183 B1 5/2001 Kono et al.
7,328,962 B2 * 2/2008 Higuchi ............... B41J 2/16579 347/19
2004/0223027 A1 11/2004 Shinkawa et al.
2020/0247127 A1 * 8/2020 Sakamoto ............ B41J 2/16579
2020/0298571 A1 * 9/2020 Honda ..................... B41J 2/145

FOREIGN PATENT DOCUMENTS

JP H08-309963 A 11/1996
JP 2013-144453 A 7/2013

* cited by examiner

*Primary Examiner* — Anh T Vo
(74) *Attorney, Agent, or Firm* — Global IP Counselors, LLP

(57) ABSTRACT

A printing apparatus includes a printing head that includes a plurality of nozzles, each of which ejects an ink pushed out from a pressure chamber by driving of an actuator, a display unit, a detector that generates a residual vibration in the pressure chamber by imparting, to the actuator, a predetermined drive signal that prevents the nozzle from ejecting the ink, and, based on the residual vibration, performs, for each of the plurality of nozzles, defective nozzle detection processing of detecting a defective nozzle having ejection failure, and a display control unit that causes the display unit to display defective nozzle information including a position, in the printing head, of the defective nozzle detected by the detector.

10 Claims, 7 Drawing Sheets

PRINTING APPARATUS, DISPLAY METHOD, AND DISPLAY SYSTEM

The present application is based on, and claims priority from JP Application Serial Number 2021-146816, filed Sep. 9, 2021, the disclosure of which is hereby incorporated by reference herein in its entirety.

BACKGROUND

1. Technical Field

The present disclosure relates to a printing apparatus, a display method, and a display system.

2. Related Art

In a printing apparatus configured to eject an ink from a nozzle using an inkjet method, it is known that ink thickening, mixing in of air bubbles, or adhesion of paper powder or dust that occurs in the nozzle or an internal space communicated with the nozzle causes clogging of the nozzle, thereby causing an ink ejection failure. In contrast to a nozzle performing a normal ejection, a nozzle having ejection failure may be referred to as a defective nozzle or an abnormal nozzle.

A configuration of optical ejection failure detection is known that detects an ejection failure of an inkjet head based on a number of ink droplets blocking an optical path (see JP-A-8-309963).

Further, it has been disclosed that, in a droplet ejecting device including a droplet ejecting head, an ejection abnormality detector, and a recovery unit, the droplet ejection head ejects droplets from a nozzle communicated with a cavity as a result of the pressure inside the cavity changing due to driving of an actuator, and the ejection abnormality detector detects a frequency of a signal corresponding to the pressure change inside the cavity, the frequency of the signal being higher when air bubbles are mixed in the cavity than when the ejection is normally performed, and being lower when the droplets cannot be ejected due to adhesion of a liquid to the nozzle than when the air bubbles are mixed in the cavity (see JP-A-2013-144453).

At a time of a product inspection or when explaining product quality to a customer, there has been a demand for a pattern that can visually show whether each nozzle is a defective nozzle or not to be output as a printed material. In other words, as in JP-A-8-309963 and JP-A-2013-144453, when the ejection failure of the nozzle is detected, a detection result is provided as the printed pattern as described above. Thus, there has been a problem in that a printing medium and an ink are consumed in order to check whether the nozzle is good or defective.

SUMMARY

A printing apparatus includes a printing head including a plurality of nozzles configured to eject an ink pushed out from a pressure chamber by driving of an actuator, a display unit, a detector configured to generate a residual vibration in the pressure chamber by imparting, to the actuator, a predetermined drive signal that prevents the nozzle from ejecting the ink, and, to perform, based on the residual vibration, defective nozzle detection processing of detecting a defective nozzle having ejection failure, for each of the plurality of nozzles, and a display control unit configured to cause the display unit to display defective nozzle information including a position, in the printing head, of the defective nozzle detected by the detector.

A display method, which is performed by a printing apparatus including a printing head including a plurality of nozzles configured to eject an ink pushed out from a pressure chamber by driving of an actuator, includes a detection step of generating a residual vibration in the pressure chamber by imparting, to the actuator, a predetermined drive signal that prevents the nozzle from ejecting the ink, and, performing, based on the residual vibration, defective nozzle detection processing of detecting a defective nozzle having ejection failure, for each of the plurality of nozzles, and a display control step of causing the display unit to display defective nozzle information including a position, in the printing head, of the defective nozzle detected in the detection step.

A display system includes a printing apparatus and a display device communicably coupled to each other. The printing apparatus includes a printing head including a plurality of nozzles configured to eject an ink pushed out from a pressure chamber by driving of an actuator, a detector configured to generate a residual vibration in the pressure chamber by imparting, to the actuator, a predetermined drive signal that prevents the nozzle from ejecting the ink, and, to perform, based on the residual vibration, defective nozzle detection processing of detecting a defective nozzle having ejection failure, for each of the plurality of nozzles, and a communication unit configured to transmit, to the display device, defective nozzle information including a position, in the printing head, of the defective nozzle detected by the detector. The display device displays the defective nozzle information received from the printing apparatus.

DESCRIPTION OF EXEMPLARY EMBODIMENTS

An embodiment of the present disclosure will be described below with reference to the accompanying drawings. Note that each of the drawings is merely illustrative for describing the embodiment. Since the drawings are illustrative, proportions and shapes may not be precise, match each other, or some may be omitted.

1. Overview Description of System

Figure 1:
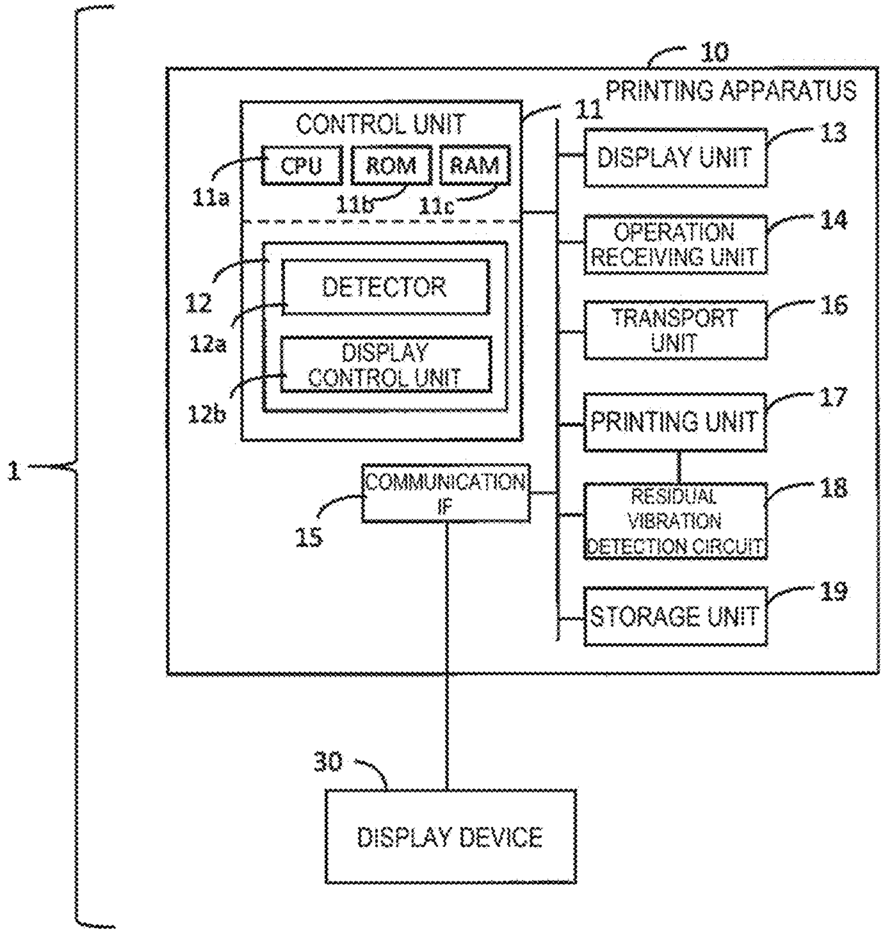
FIG. 1 is a block diagram illustrating a system configuration according to an embodiment in a simplified manner.

FIG. 1 illustrates a configuration of a display system 1 according to the embodiment. The display system 1 may be referred to as a printing system 1, a defective nozzle detection system 1, or the like. The display system 1 includes a printing apparatus 10 and a display device 30. A display method according to the embodiment is performed by the printing apparatus 10 or the display system 1.

The printing apparatus 10 is provided with a control unit 11, a display unit 13, an operation receiving unit 14, a communication IF 15, a transport unit 16, a printing unit 17, a residual vibration detection circuit 18, a storage unit 19, and the like. IF is an abbreviation for interface. The control unit 11 is configured to include one or a plurality of ICs including a CPU 11*a* as a processor, a ROM 11*b*, a RAM 11*c*, and the like, another non-volatile memory, and the like. In the control unit 11, the processor, that is, the CPU 11*a* executes arithmetic processing in accordance with a program 12 stored in the ROM 11*b*, the other memory, or the like, using the RAM 11*c* or the like as a work area.

The control unit 11 realizes a plurality of functions such as a detector 12*a*, a display control unit 12*b*, and the like in accordance with the program 12. These functions are only some of the functions the program 12 causes the control unit 11 to realize. It is needless to say that the control unit 11 functions to cause the printing apparatus 10 to perform known printing processing. Note that the processor is not limited to the single CPU. A configuration may be adopted in which the processing is performed by a hardware circuit such as a plurality of CPUs, an ASIC, or the like, or a configuration may be adopted in which the CPU and the hardware circuit work in concert to perform the processing.

The display unit 13 is a device for displaying visual information, and is constituted, for example, by a liquid crystal display, an organic EL display, or the like. The display unit 13 may be configured to include a display and a drive circuit for driving the display. The operation receiving unit 14 is a device for receiving an operation by a user, and is realized, for example, by a physical button, a touch panel, a mouse, a keyboard, or the like. Of course, the touch panel may be realized as a function of the display unit 13. The display unit 13 and the operation receiving unit 14 may be collectively referred to as an operation panel of the printing apparatus 10. The display unit 13 and the operation receiving unit 14 may be part of the configuration of the printing apparatus 10, or may be peripheral devices externally coupled to the printing apparatus 10.

The communication IF 15 is a generic term for one or a plurality of IFs for the printing apparatus 10 to communicate with another device in a wired or wireless manner in accordance with a predetermined communication protocol including a known communication standard. The communication IF 15 corresponds to a "communication unit". In an example illustrated in FIG. 1, the control unit 11 is coupled to the display device 30 via the communication IF 15. The display device 30 is a device with a communication function and a visual information display function, and corresponds, for example, to various communication terminals such as a personal computer (PC), a smartphone, a tablet-type terminal, and the like. Instead of the display unit 13, the display device 30 may be considered as the display unit. If "defective nozzle information", which will be described below, is displayed on the display unit 13, the display device 30 need not necessarily be provided, and conversely, if the "defective nozzle information" is displayed on the display device 30, the display unit 13 need not necessarily be provided. Via the communication IF 15, the control unit 11 can be communicably coupled to various external devices, which are not illustrated in FIG. 1.

The transport unit 16 is a unit for transporting a printing medium along a predetermined transport direction under control of the control unit 11, and includes, for example, a roller that rotates to transport a medium, a motor for driving the roller, and the like. The printing medium is typically a paper sheet, but may be a medium made from a material other than paper as long as recording can be performed on the medium using a liquid.

The printing unit 17 is a mechanism for ejecting a liquid such as an ink using an inkjet method and performing printing on the printing medium. The printing unit 17 includes a printing head 20 as will be described below. The printing head 20 includes a plurality of nozzles 21 for ejecting an ink, and ejects the ink from each of the nozzles 21 onto a printing medium 40 transported by the transport unit 16 under the control of the control unit 11. Droplets ejected by the printing head 20 via the nozzles 21 are also referred to as dots. The printing head 20 may be referred to as a recording head, a liquid ejecting head, a print head, an inkjet head, or the like.

The storage unit 19 is, for example, a hard disk drive, a solid state drive, or a storage unit constituted by another memory. A part of the memory included in the control unit 11 may be considered as the storage unit 19. The storage unit 19 may be considered as a part of the control unit 11.

Figure 2:
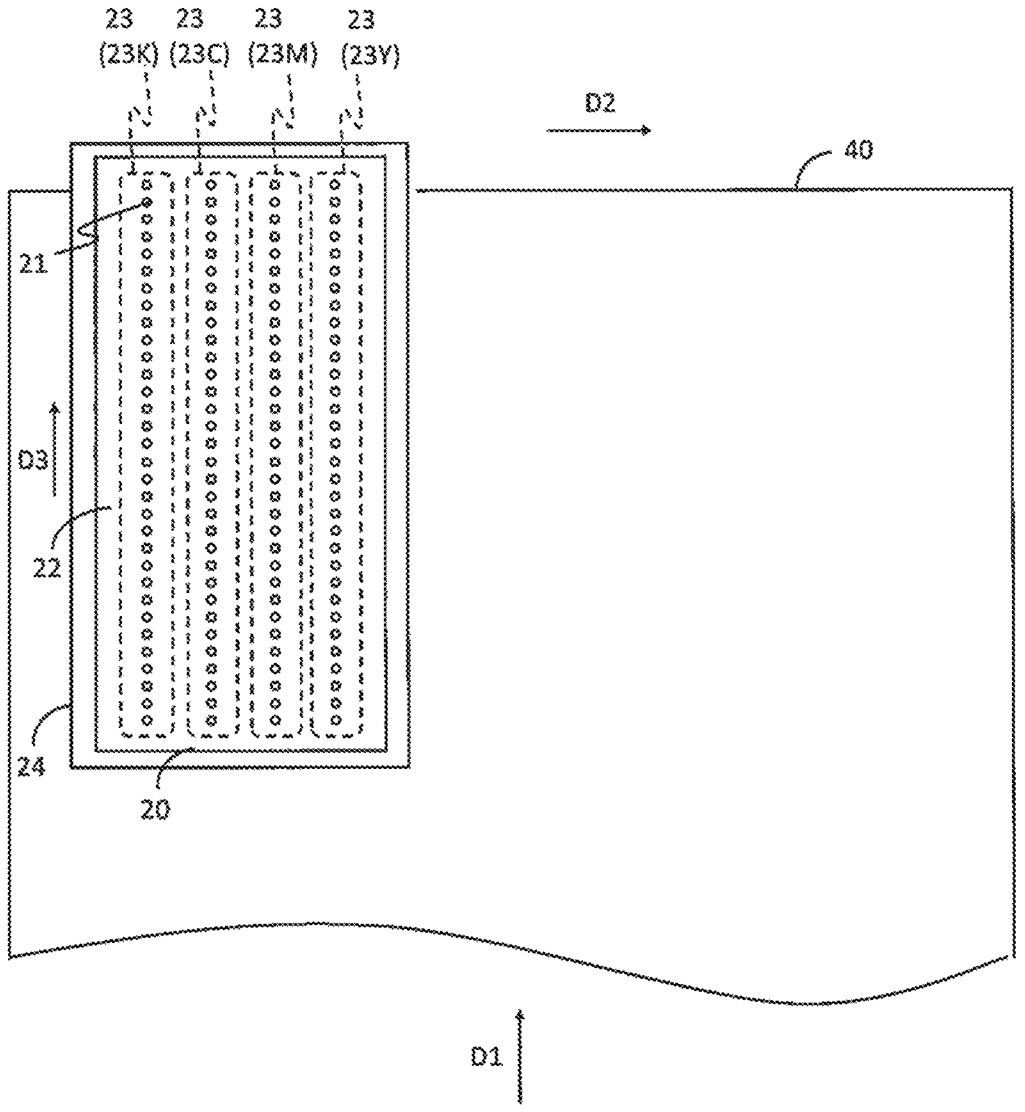
FIG. 2 is a diagram illustrating a relationship between a printing head and a printing medium, and the like, as seen from above, in a simplified manner.

FIG. 2 is a diagram illustrating a relationship between the printing head 20 and the printing medium 40, and the like, as seen from above, in a simplified manner. In an example illustrated in FIG. 2, the printing head 20 is mounted on a carriage 24. In other words, the printing unit 17 includes the printing head 20 and the carriage 24. The carriage 24 is a mechanism that receives power from a motor (not illustrated) and can reciprocate along a main scanning direction D2 intersecting with a transport direction D1. Thus, the printing head 20 reciprocates back and forth along the main scanning direction D2 together with the carriage 24. The intersection between the transport direction D1 and the main scanning direction D2 may be interpreted as being orthogonal. However, being orthogonal is not limited to being strictly orthogonal, and may be an intersection including a tolerance occurring in a product.

In FIG. 2, an arrangement of the nozzles 21 at a nozzle surface 22 of the printing head 20 is illustrated. The nozzle surface 22 is a surface at which the nozzles 21 open and can face the printing medium 40. In FIG. 2, small circles represent the individual nozzles 21. In a configuration in which inks of each color are ejected from the nozzles 21, the printing head 20 includes nozzle rows 23 for each of the ink colors, the inks being supplied from a liquid holding unit (not illustrated) that is referred to as an ink cartridge, an ink tank, or the like. Here, the nozzle rows 23 are provided for each of cyan (C), magenta (M), yellow (Y), and black (K) inks. Each of the nozzle rows 23 is constituted by a plurality of the nozzles 21, and an interval (nozzle pitch) between the nozzles 21 in the transport direction D1 is constant or substantially constant. The direction in which the plurality of nozzles 21 constituting the nozzle row 23 are aligned is referred to as a nozzle row direction D3.

As a configuration of the printing head 20, an example is also known in which the nozzle row direction D3 intersects with the transport direction D1 diagonally, but in FIG. 2, an example is illustrated in which the nozzle row direction D3 is parallel to the transport direction D1. The nozzle row 26 including the nozzles 21 that eject the C ink is also referred to as a nozzle row 26C. Similarly, the nozzle row 26 including the nozzles 21 that eject the M ink is also referred to as a nozzle row 26M, the nozzle row 26 including the nozzles 21 that eject the Y ink is also referred to as a nozzle row 26Y, and the nozzle row 26 including the nozzles 21 that eject the K ink is also referred to as a nozzle row 26K. The nozzle rows 23C, 23M, 23Y, and 23K are aligned along the main scanning direction D2.

The K ink is an example of an achromatic color ink, and the C, M, Y inks are examples of a chromatic color ink. Thus, the nozzle row 23K corresponds to an achromatic color nozzle row in which the plurality of nozzles 21 for ejecting an achromatic color ink are aligned. Further, each of the nozzle rows 23C, 23M, and 23Y corresponds to a chromatic color nozzle row in which the plurality of nozzles 21 for ejecting a chromatic color ink are aligned.

The control unit 11 prints an image on the printing medium 40 in a two-dimensional manner by combining the transport of the printing medium 40 by the transport unit 16 from upstream to downstream in the transport direction D1, and the ink ejection from the printing head 20 as a result of the printing head 20 being caused to reciprocate back and forth by the carriage 24. The ink ejection as a result of the printing head 20 reciprocating back and forth is also referred to as main scanning or a pass. In the example illustrated in FIG. 2, the printing medium 40 is stationary while the main scanning is being performed. Of course, the printing head 20 may be a type capable of ejecting an ink of a color other than CMYK, or ejecting a liquid other than the ink.

Figure 3:
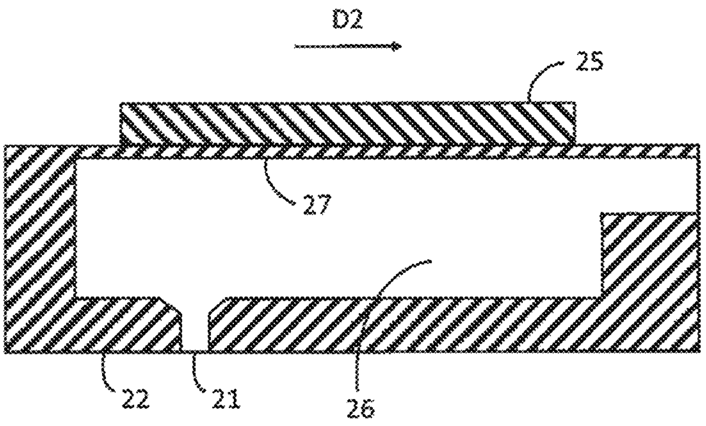
FIG. 3 is a cross-sectional view illustrating a configuration of a pressure chamber corresponding to a single nozzle 21, and the like in a simplified manner.

FIG. 3 is a cross-sectional view illustrating a configuration of a pressure chamber 26, and the like corresponding to the single nozzle 21 in a simplified manner. FIG. 3 illustrates a cross section passing through the single nozzle 21 included in the printing head 20, the cross section being perpendicular to the transport direction D1. The nozzle 21 that opens to the nozzle surface 22 is communicated with the pressure chamber 26 inside the printing head 20. An ink is supplied to the pressure chamber 26 from the ink cartridge or the like via a reservoir or the like (not illustrated), and the pressure chamber 26 is filled with the ink. The pressure chamber 26 may be referred to as a cavity or an ink chamber. One surface of the pressure chamber 26 is formed as a vibrating plate 27, and an actuator 25 is disposed so as to sandwich the vibrating plate 27 with the pressure chamber 26.

The actuator 25 is constituted by a piezoelectric element or an electrode, and deforms when a drive signal is applied thereto under the control of the control unit 11. The vibrating plate 27 bends in accordance with the deformation of the actuator 25, and as a result of a pressure change occurring inside the pressure chamber 26, the ink is pushed out from the pressure chamber 26 and ejected from the nozzle 21. Such a configuration as illustrated in FIG. 3 is formed for each of the nozzles 21, and the printing head 20 ejects or does not eject a dot from each of the nozzles 21 in order to print an image desired by the user. However, the configuration illustrated in FIG. 3 is merely an example, and any one of various known modes can be employed as the configuration of the pressure chamber communicated with the nozzle 21 and the actuator.

2. Defective Nozzle Detection Processing

Defective nozzle detection processing performed by the detector 12*a* will be briefly described below. This is a description of a "detection step" of the embodiment. The detector 12*a* imparts, to the actuator 25, a predetermined drive signal that prevents the nozzle 21 from ejecting the ink to generate a residual vibration in the pressure chamber 26, and performs, for each of the plurality of nozzles 21 included in the printing head 20, the defective nozzle detection processing for detecting a defective nozzle having ejection failure based on the residual vibration. Detailed descriptions regarding a specific method of detecting the defective nozzle without performing an operation of ejecting the ink from the nozzle 21 and a configuration of the residual vibration detection circuit 18 are omitted in this specification, and references are made to Japanese Patent No. 4957855, Japanese Patent No. 5736848, or Japanese Patent No. 6119509 as appropriate.

Generally, the detector 12*a* outputs, to the actuator 25 of the nozzle 21 to be inspected, a drive signal having an inspection waveform for generating the residual vibration without causing the dot to be ejected. Then, the residual vibration detection circuit 18 detects, as a change in the electromotive force of the piezoelectric element constituting the actuator 25, the residual vibration obtained after a pressure change having occurred in the pressure chamber 26 due to the drive signal. The detector 12*a* acquires a signal of the residual vibration detected by the residual vibration detection circuit 18, and compares the state of the remaining vibration such as frequency, cycle, or amplitude, for example, with a preset reference value to determine whether the state is normal or abnormal. In this way, the detector 12*a* determines whether the nozzle 21 is a nozzle performing normal ink ejection (normal nozzle) or a nozzle having ejection failure (defective nozzle). In other words, since characteristics of the residual vibration are different between when the nozzle 21 is normal and when the nozzle 21 is not normal due to an effect of the above-described increased ink viscosity, mixing in of air bubbles, adhesion of the paper powder, or the like, it is possible to determine whether the nozzle 21 is the normal nozzle or the defective nozzle by evaluating the residual vibration. The detector 12*a* performs such processing for each of the plurality of nozzles 21 as an inspection target, to detect the defective nozzle from among the plurality of nozzles 21.

The detector 12*a* stores a result of the defective nozzle detection processing in the storage unit 19. In other words, the storage unit 19 stores information about whether the nozzle 21 is the normal nozzle or the defective nozzle for each of the plurality of nozzles 21 included in the printing head 20. A timing at which the detector 12*a* performs the defective nozzle detection processing is not particularly limited. The detector 12*a* performs the defective nozzle detection processing at regular or irregular timings, performs the processing in response to a request from the user, or performs the processing before, after, or during printing processing.

Figure 4:
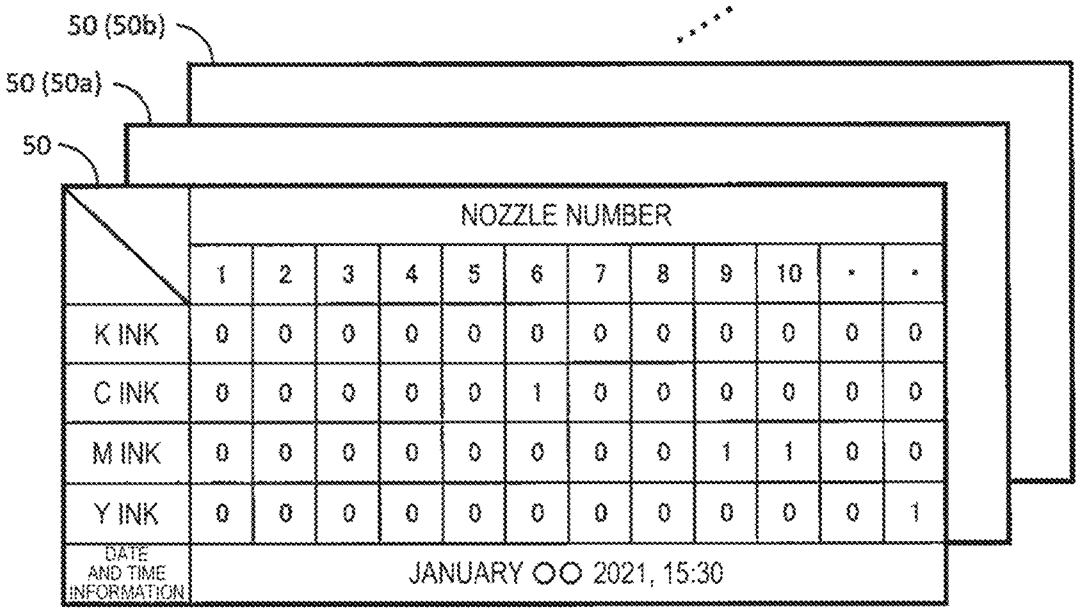
FIG. 4 is a diagram illustrating an example of nozzle inspection result information.

FIG. 4 illustrates nozzle inspection result information 50 as a result of the defective nozzle detection processing. Based on the configuration illustrated in FIG. 2, the nozzle inspection result information 50 indicates whether the nozzle 21 is the normal nozzle or the defective nozzle for each of the CMYK inks, that is, for each of the nozzle rows 23C, 23M, 23Y, and 23K, and also for each nozzle number. The nozzle number is a number that is assigned to each of the nozzles 21 and indicates an arrangement order of the nozzles 21 in the nozzle row 23. The nozzle number is, for example, assigned to each of the nozzles 21 in the nozzle row 23 in a manner of nozzle number=1, 2, 3 . . . from downstream to upstream in the transport direction D1. In an example illustrated in FIG. 4, in the nozzle inspection result information 50, "0" means the normal nozzle, and "1" means the defective nozzle. In the example illustrated in FIG. 4, the nozzle numbers up to 10 are illustrated, but it goes without saying that the number of nozzles constituting the nozzle row 23 may be greater than 10.

When the defective nozzle detection processing is performed for each of the nozzles 21 as the inspection target, the detector 12*a* stores the nozzle inspection result information 50 described above in the storage unit 19. The detector 12*a* stores the nozzle inspection result information 50 together with date and time information indicating a date and time when the defective nozzle detection processing is performed. The detector 12*a* not only stores, in the storage unit 19, the nozzle inspection result information 50 as a result of the latest defective nozzle detection processing, but also consecutively stores, in the storage unit 19, the nozzle inspection result information 50 as a result of the defective nozzle detection processing performed in the past. Nozzle inspection result information 50*a* and 50*b* illustrated in FIG. 4 is an example of the nozzle inspection result information 50 as the result of the defective nozzle detection processing performed in the past. In this manner, the storage unit 19 also stores the result of the defective nozzle detection processing performed by the detector 12*a* in the past.

3. Display Processing of Defective Nozzle Information

Figure 5:
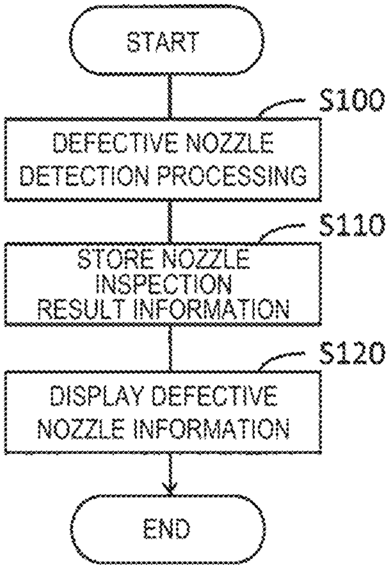
FIG. 5 is a flowchart illustrating processing performed by a control unit in accordance with a program.

FIG. 5 is a flowchart illustrating an example of a flow of processing according to the embodiment performed by the control unit 11 in accordance with the program 12.

At step S100, the detector 12*a* performs the defective nozzle detection processing for each of the nozzles 21 included in the printing head 20 as the inspection target.

At step S110, the detector 12*a* causes the storage unit 19 to store the nozzle inspection result information 50 as a result of the defective nozzle detection processing performed at step S100.

Steps S100 and S110 are as already described above.

At step S120, the display control unit 12*b* causes the display unit 13 to display the "defective nozzle information" including a position, in the printing head 20, of the defective nozzle detected by the detector 12*a*. In other words, the display control unit 12*b* performs a "display control step". The defective nozzle information is information based on the nozzle inspection result information 50, and may be interpreted as being substantially the same as the nozzle inspection result information 50. However, the defective nozzle information is information representing the position of the defective nozzle in a visually easy-to-understand manner based on the nozzle inspection result information 50.

Figure 6:
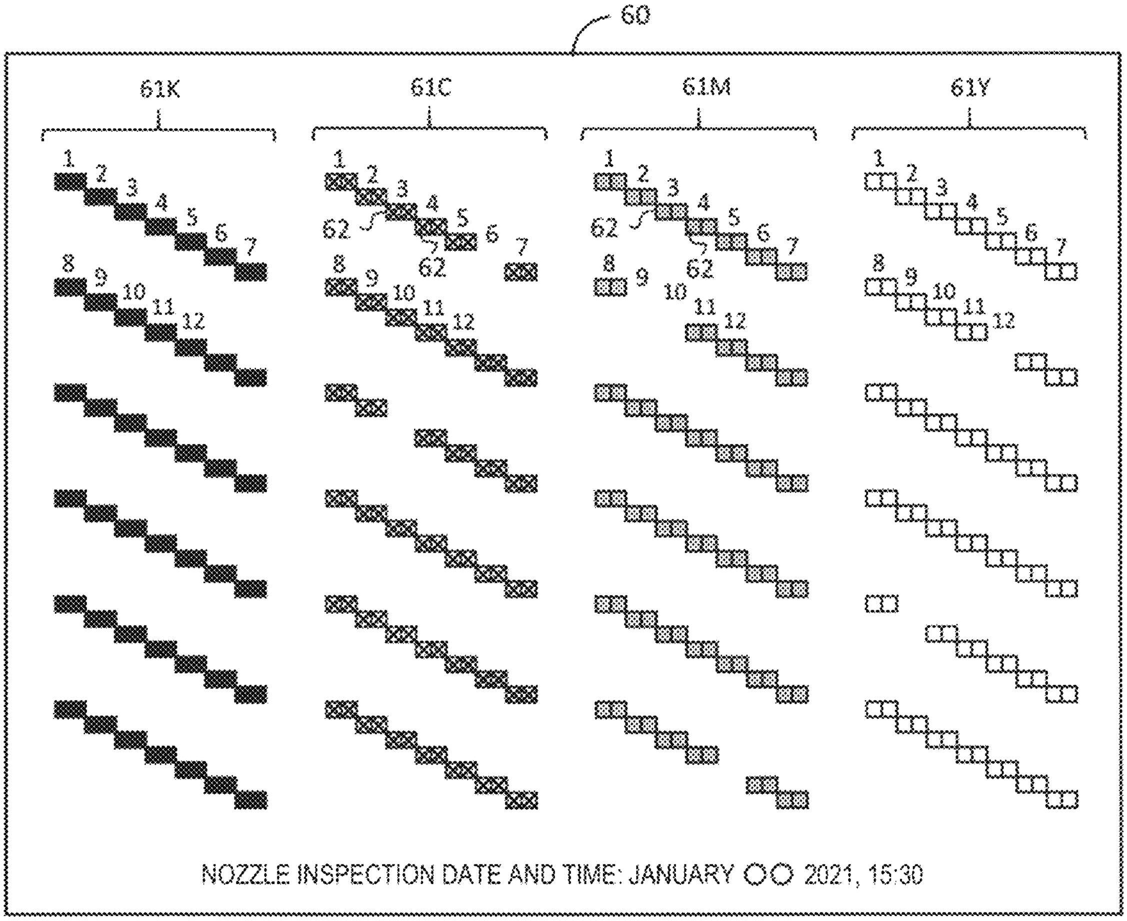
FIG. 6 is a diagram illustrating an example of a pattern image.

FIG. 6 illustrates a pattern image 60 as a specific example of the defective nozzle information. The display control unit 12*b* generates the pattern image 60 based on the nozzle inspection result information 50, and causes the display unit 13 to display the pattern image 60. The pattern image 60 is an image representing the position of the normal nozzle that does not correspond to the defective nozzle and the position of the defective nozzle using different printing results, the printing result corresponding to the position of each of the nozzles 21 in each of the plurality of nozzle rows 23.

Specifically, the pattern image 60 includes a black pattern 61K representing the printing result of the nozzle row 23K, a cyan pattern 61C representing the printing result of the nozzle row 23C, a magenta pattern 61M representing the printing result of the nozzle row 23M, and a yellow pattern 61Y representing the printing result of the nozzle row 23Y. In the embodiment, since these patterns are not actually printed, the "printing result" means a result that is assumed to be obtained if the pattern is actually printed.

Each of the patterns 61K, 61C, 61M, and 61Y is constituted by each of pattern elements 62 corresponding to the position of each of the nozzles 21 in the nozzle row 23. In other words, in the pattern image 60, it is represented that one of the nozzles 21 prints one of the pattern elements 62. In an example illustrated in FIG. 6, the vertical direction of the pattern image 60 corresponds to the transport direction D1 and the nozzle row direction D3. In the pattern image 60, the pattern elements 62 corresponding to each of the nozzles 21 that are positioned consecutively are shifted in the horizontal direction in order to make it easier to visually recognize each one of the pattern elements 62. Further, the pattern image 60 displays the date and time information included in the nozzle inspection result information 50 as the nozzle inspection date and time.

In the pattern image 60, it is represented that the pattern element 62 is printed by the normal nozzle, and the pattern element 62 is not printed by the defective nozzle. In other words, the pattern element 62 is a printing result corresponding to the position of the normal nozzle, and an "empty space" in which the pattern element 62 does not exist is a printing result corresponding to the position of the defective nozzle. In the example illustrated in FIG. 6, the pattern image 60 indicates the nozzle number in the vicinity of the position of each of the pattern elements 62. By displaying the nozzle numbers in this manner, it is possible to enable the user to easily recognize whether each of the nozzles 21 is the normal nozzle or the defective nozzle.

Here, according to the nozzle inspection result information 50 illustrated in FIG. 4, the nozzle number 6 corresponding to the C ink, that is, corresponding to the nozzle row 23C, is detected as the defective nozzle. Thus, in the pattern image 60 illustrated in FIG. 6, the position of the nozzle number 6 of the cyan pattern 61C is the empty space in which the pattern element 62 does not exist. In addition, according to the nozzle inspection result information 50, for example, the nozzle numbers 9 and 10 corresponding to the M ink, and the like are detected as the defective nozzles, and thus, in the pattern image 60, the positions of the nozzle numbers 9 and 10 of the magenta pattern 61M, and the like are the empty spaces.

The pattern image 60 is an image representing the printing result of each of the nozzle rows 23C, 23M, 23Y, and 23K using the color of the ink corresponding to each of the nozzle rows 23C, 23M, 23Y, and 23K. In other words, each of the pattern elements 62 constituting the black pattern 61K is displayed in black or a black-based color. Similarly, each of the pattern elements 62 constituting the cyan pattern 61C is displayed in cyan or a cyan-based color. Each of the pattern elements 62 constituting the magenta pattern 61M is displayed in magenta or a magenta-based color. Each of the pattern elements 62 constituting the yellow pattern 61Y is displayed in yellow or a yellow-based color. In FIG. 6, the difference in color between each of the patterns 61K, 61C, 61M, and 61Y is represented by the difference in concentration and design of the pattern element 62. In this manner, by representing each of the patterns 61K, 61C, 61M, and 61Y using the color equivalent or similar to the actual color of the ink, the user can intuitively recognize which of the nozzles 21 of which of the nozzle rows 23 is defective.

However, the pattern image 60 may be an image in which, of the plurality of nozzle rows 23, the printing result of the nozzle row 23 corresponding to an ink of a first color is represented by a color different from the first color, and the printing results of each of the other nozzle rows 23 corresponding to the inks other than the first color are represented by the color of the inks corresponding to each of the nozzle rows 23, as described above.

For example, since Y is a color that has a relatively low concentration and that is difficult to visually recognize, Y may be set as the first color, and the display control unit 12*b* may represent each of the pattern elements 62 constituting the yellow pattern 61Y corresponding to the nozzle row 23Y using a color other than yellow, such as using an orange-based color, for example. Further, it is assumed that the printing head 20 includes the nozzle row 23 for ejecting a transparent clear ink from each of the nozzles 21. In such a case, the display control unit 12*b* may set the clear ink as the first color, and when displaying the pattern image 60, may represent each of the pattern elements 62 constituting a pattern corresponding to the nozzle row 23 of the clear ink using a gray-based color, for example.

In the example illustrated in FIG. 6, the printing result corresponding to the position of the defective nozzle in the pattern image 60 is the empty space, but the display control unit 12*b* may represent the printing result corresponding to the position of the defective nozzle using a specific mark, color, or description that is different from that of the pattern element 62 representing the position of the normal nozzle. Alternatively, in contrast to the description above, when displaying the pattern image 60, the display control unit 12*b* may represent the printing result corresponding to the position of the normal nozzle using the empty space, and represent the printing result corresponding to the position of the defective nozzle using the pattern element 62, the specific mark, or the like.

In other words, it is sufficient that, in the pattern image 60, the position of the normal nozzle and the position of the defective nozzle be distinguished from each other in a visually easy-to-understand manner.

Further, the display control unit 12*b* may display the entire pattern image 60 in a monochromatic manner. In other words, all the patterns 61K, 61C, 61M, and 61Y may be displayed in the same color. However, in this case, the display control unit 12*b* includes, in the pattern image 60, a description indicating the color of the ink corresponding to each of the patterns 61K, 61C, 61M, and 61Y, to assist the user's understanding.

Figure 7:
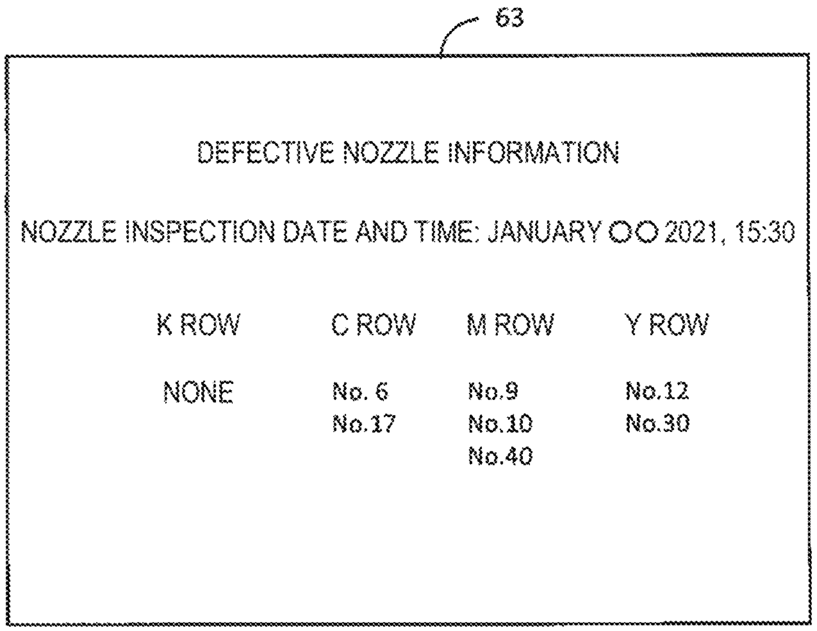
FIG. 7 is a diagram illustrating an example of a defective nozzle number image.

FIG. 7 illustrates a defective nozzle number image 63 as a specific example of the defective nozzle information. At step S120, the display control unit 12*b* may generate the defective nozzle number image 63 based on the nozzle inspection result information 50, and cause the display unit 13 to display the defective nozzle number image 63. The defective nozzle number image 63 is an image indicating the nozzle number of the defective nozzle, among the nozzle numbers assigned to each of the nozzles 21 in accordance with the position of each of the nozzles 21 in the printing head 20.

According to FIG. 7, the defective nozzle number image 63 displays a list of the nozzle numbers of the defective nozzles for each of the nozzle rows 23C, 23M, 23Y, and 23K in the printing head 20, if the defective nozzle exists therein. Similarly to the pattern image 60, the defective nozzle number image 63 also displays the date and time information included in the nozzle inspection result information 50 as the nozzle inspection date and time. Even when the above-described defective nozzle number image 63 is displayed instead of the pattern 60, it is possible to enable the user to know the position of the defective nozzle in an easy-to-understand manner.

4. Summary

As described above, according to the embodiment, the printing apparatus 10 includes the printing head 20 including the plurality of nozzles 21 each configured to eject the ink pushed out from the pressure chamber 26 by the driving of the actuator 25, the display unit 13, the detector 12*a* configured to generate the residual vibration in the pressure chamber 26 by imparting, to the actuator 25, the predetermined drive signal that prevents the nozzle 21 from ejecting the ink, and, based on the residual vibration, perform, for each of the plurality of nozzles 21, the defective nozzle detection processing of detecting the defective nozzle experiencing the ejection failure, and the display control unit 12*b* configured to cause the display unit 13 to display the defective nozzle information including the position, in the printing head 20, of the defective nozzle detected by the detector 12*a*.

According to the configuration described above, by causing the display unit 13 to display the defective nozzle information, the printing apparatus 10 can cause the user to recognize the position of the defective nozzle without consuming the ink or the printing medium. Further, as in related art, when the printing result, on the printing medium, of the inspection pattern generated by each of the nozzles is shown to the user, depending on the color of the printing medium, the user sometimes finds it difficult to visually recognize some of the colors of the inks. However, as in the embodiment, by causing the display unit 13 to display the defective nozzle information, visibility is easily ensured.

Further, according to the embodiment, the plurality of nozzles 21 are aligned in the nozzle row 23, and the printing head 20 includes the plurality of nozzle rows 23 respectively corresponding to the inks of different colors. Then, the defective nozzle information is the pattern image 60 representing the position of the nozzle 21 that does not correspond to the defective nozzle and the position of the defective nozzle using the different printing results, the printing result corresponding to the position of each of the nozzles 21 in each of the plurality of nozzle rows 23.

According to the configuration described above, by displaying the pattern image 60 on the display unit 13, it is possible to enable the user to easily recognize which of the nozzles 21 at which position in which of the nozzle rows 23 is the defective nozzle.

Further, according to the embodiment, the pattern image 60 may be the image representing the printing result of each of the plurality of nozzle rows 23 using the color of the ink corresponding to each of the nozzle rows 23.

According to the configuration described above, since the printing result corresponding to the nozzle row 23 in the pattern image 60 is represented by the color of the ink corresponding to the nozzle row 23, the user can intuitively recognize which of the nozzles 21 corresponding to which of the inks is the defective nozzle.

Alternatively, the pattern image 60 may be the image representing the printing result of the nozzle row 23, corresponding to the ink of the first color, of the plurality of nozzle rows 23, using a color different from the first color, and representing the printing result of each of the nozzle rows 23 corresponding to the color of the ink other than the first color, of the plurality of nozzle rows 23, using the color of the ink corresponding to each of the nozzle rows 23.

According to the configuration described above, for example, when the user finds it difficult to visually recognize a color on the display unit 13 when the color is represented by the original color, by changing the color to the first color, it is possible to display whether the nozzle is the defective nozzle or not in a visually easy-to-understand manner for each of the nozzles 21 in all of the nozzle rows 23.

Further, according to the embodiment, the defective nozzle information may be the nozzle number of the defective nozzle, among the nozzle numbers assigned to each of the nozzles 21 in accordance with the position of each of the nozzles 21 in the printing head 20.

According to the configuration described above, since the defective nozzle information is character information, it is possible to reduce the processing load of generating the defective nozzle information compared to a case in which the pattern image 60 is generated as the defective nozzle information.

The printing apparatus 10 may transmit the defective nozzle information from the communication IF 15 to the display device 30, and cause the display device 30 to display the defective nozzle information.

In other words, the display system 1 includes the printing apparatus 10 and the display device 30 that are communicably coupled to each other. The printing apparatus 10 includes the printing head 20 including the plurality of nozzles 21 each configured to eject the ink pushed out from the pressure chamber 26 by the driving of the actuator 25, the detector 12*a* configured to generate the residual vibration in the pressure chamber 26 by imparting, to the actuator 25, the predetermined drive signal that prevents the nozzle 21 from ejecting the ink, and, based on the residual vibration, perform, for each of the plurality of nozzles 21, the defective nozzle detection processing of detecting the defective nozzle experiencing the ejection failure, and the communication unit configured to transmit, to the display device 30, the defective nozzle information including the position, in the printing head 20, of the defective nozzle detected by the detector 12*a*. Then, the display device 30 displays the defective nozzle information received from the printing apparatus 10.

According to the configuration described above, for example, the defective nozzle information can be displayed on a PC or a smartphone that is held by the user, and thus, convenience of the user can be further improved. The printing apparatus 10 may display the defective nozzle information on either one of the display unit 13 and the display device 30, or may display the defective nozzle information on both of the display unit 13 and the display device 30.

Furthermore, the embodiment is not limited to an apparatus or a system, and discloses various categories of the invention such as a method performed by the apparatus or the system, and the program 12 that causes the processor to execute the method.

For example, the display method, which is performed by the printing apparatus 10 including the printing head 20 including the plurality of nozzles 21 each configured to eject the ink pushed out from the pressure chamber 26 by the driving of the actuator 25, includes a detection step of generating the residual vibration in the pressure chamber 26 by imparting, to the actuator 25, the predetermined drive signal that prevents the nozzle 21 from ejecting the ink, and, performing, based on the residual vibration, the defective nozzle detection processing of detecting the defective nozzle experiencing the ejection failure, for each of the plurality of nozzles 21, and a display control step of causing a predetermined display unit, such as the display unit 13 and the display device 30, to display the defective nozzle information including the position, in the printing head 20, of the defective nozzle detected at the detection step.

5. Modified Examples

Several modified examples included in the embodiment will be described below. It goes without saying that combinations of these modified examples are also included in the embodiment. Also, the printing apparatus 10 may cause the display device 30 to display each piece of information displayed on the display unit 13 in the following description.

First Modified Example

As described above, the printing head 20 includes the achromatic color nozzle row in which the plurality of nozzles 21 for ejecting the achromatic color ink are aligned, and the chromatic color nozzle row in which the plurality of nozzles 21 for ejecting the chromatic color ink are aligned. For example, by operating the operation receiving unit 14, the user can instruct the control unit 11 to select a desired printing mode from among a plurality of printing modes such as a monochrome printing mode that uses only the achromatic color ink, and a color printing mode that uses the chromatic color inks. The printing mode is a mode used to cause the printing unit 17 to perform printing of an image desired by the user.

In a first modified example, it is assumed that the monochrome printing mode is selected. When the monochrome printing mode is specified, if the defective nozzle is only present in the chromatic color nozzle row, since the defective nozzle does not affect the printing, the display control unit 12*b* causes the display unit 13 to indicate that it is not required to perform cleaning processing to the printing head 20 (hereinafter referred to as a cleaning not required display).

In other words, referring to the nozzle inspection result information 50 stored at step S110, if the defective nozzle is not present in the nozzle row 23K corresponding to the K ink and is present only in one of the nozzle rows 23C, 23M, 23Y corresponding to the C, M, Y inks, respectively, the display control unit 12*b* causes the display unit 13 to also display the cleaning not required display in addition to the display of the defective nozzle information at step S120. The cleaning not required display is, for example, a message composed by a character string such as "Since the monochrome printing mode is selected, the head cleaning is not required". The display unit 13 is caused to display such a message along with the pattern image 60 or the defective nozzle number image 63.

Although a detailed description is omitted, the cleaning processing is, for example, processing of removing ink residue, paper powder, or the like adhered to the openings of the nozzles 21 by cleaning the nozzle surface 22 of the printing head 20 using a wiper (not illustrated). Further, the concept of cleaning processing may also include so-called flashing that is performed to resolve the ejection failure by forcibly causing each of the nozzles 21 to eject the ink. Alternatively, measures for improving the ejection failure in the printing head 20 may be collectively referred to as the cleaning processing. The user can instruct the printing apparatus 10 to perform the cleaning processing.

By causing the display unit 13 to display the above-described cleaning not required display, the display control unit 12*b* causes the user to acknowledge that desired printing can be performed under the current monochrome printing mode without performing the cleaning processing, and can thus improve the operational efficiency of the user.

Second Modified Example

When the positions of the defective nozzles are consecutive, it is difficult to compensate for missing dots (so-called dot omission) on the printing medium 40 due to the defective nozzles, using the normal nozzles surrounding the dots. Therefore, when the positions of the defective nozzles are consecutive in the printing head 20, the display control unit 12*b* may cause the display unit 13 to indicate that the cleaning processing on the printing head 20 is recommended (hereinafter, this will be referred to as a cleaning recommendation display).

The display control unit 12*b* refers to the nozzle inspection result information 50 stored at step S110 to check whether or not the defective nozzles are consecutive in the nozzle row 23 for each of the CMYK inks, and when the defective nozzles are consecutive, the display control unit 12*b* causes the display unit 13 to display the cleaning recommendation display in addition to the display of the defective nozzle information at step S120. According to the nozzle inspection result information 50 in FIG. 4, two of the nozzles 21 having the nozzle numbers 9 and 10 are consecutive in the nozzle row 23M corresponding to the M ink. The cleaning recommendation display is, for example, a message composed by a character string such as "Since consecutive defective nozzles have been detected, performance of cleaning processing is recommended". The display unit 13 is caused to display such a message along with the pattern image 60 or the defective nozzle number image 63.

Of course, the user who has confirmed the presence of the defective nozzle by visually checking the pattern image 60 or the defective nozzle number image 63 can cause the printing apparatus 10 to perform the cleaning processing at his/her own discretion. However, the cleaning recommendation display can cause the user to acknowledge that the need for cleaning processing is particularly high, and it is thus possible to prevent the user from obtaining a low quality printing result.

A condition for displaying the cleaning recommendation display is not limited to the case in which the positions of the defective nozzles are consecutive in the printing head 20. The image quality degradation due to the dot omission is noticeable when a certain number or more of the defective nozzles are present within a short distance. Thus, for example, when a nozzle range having a ratio of the defective nozzles equal to or higher than a predetermined ratio exists, the nozzle range being defined as a range in the nozzle row 23 in which a predetermined number of the nozzles 21 are consecutively aligned, the display control unit 12*b* may determine this to be one of the conditions for displaying the cleaning recommendation display, and cause the display unit 13 to display the cleaning recommendation display.

Third Modified Example

As described above, the storage unit 19 also stores nozzle inspection result information 50*a* and 50*b* as the result of the defective nozzle detection processing performed by the detector 12*a* in the past. Thus, in response to a request from outside, the display control unit 12*b* causes the display unit 13 to display the defective nozzle information including the position, in the printing head 20, of the defective nozzle detected by the detector 12*a* in the past, based on a result of the defective nozzle detection processing in the past stored in the storage unit 19. The user can make a request to the printing apparatus 10 for displaying the defective nozzle information through the operation of the operation receiving unit 14 or the like, at a chosen timing different from step S120. Further, in this display request, the user can include a request for specifying a date and time or a time period when the defective nozzle detection processing was performed in the past.

When such a display request is received, it is sufficient that the display control unit 12*b* generate the defective nozzle information with reference to the nozzle inspection result information 50 whose date and time information corresponds to the date and time or the time period specified by the display request, among the nozzle inspection result information 50 stored in the storage unit 19, and cause the display unit 13 to display the generated defective nozzle information. In this way, by adopting the configuration in which the defective nozzle information in the past can also be displayed, the printing apparatus 10 can enable the user to check a history of the defective nozzle in the printing head 20. Further, by visually checking the defective nozzle information in the past, the user can also check causes of quality problems of the printing performed in the past, or can check effectiveness of the cleaning processing performed in the past.

Fourth Modified Example

The configuration of the printing unit 17 is not limited to the so-called serial printer type in which, as described above, the printing is performed on the stationary printing medium 40 by causing the printing head 20 to reciprocate along the main scanning direction D2 intersecting with the transport direction D1. The printing unit 17 may be, for example, a line printer type product in which the printing unit 17 does not include the carriage 24, but includes the printing head 20 having the main scanning direction D2 as the longitudinal direction thereof and including nozzle rows whose length is long enough to be able to cover the width of the printing medium 40, and the printing head 20 ejects inks onto the printing medium 40 transported by the transport unit 16. Alternatively, the printing unit 17 may have a configuration in which the printing is performed by moving the printing head 20 in a two-dimensional manner in a plane parallel to the surface of the printing medium 40.

What is claimed is:

1. A printing apparatus comprising:

a printing head including a plurality of nozzles which are configured to eject an ink pushed out from a pressure chamber by driving of an actuator and to each of which a nozzle number that indicates an arrangement order of the plurality of nozzles is assigned in accordance with a position of each of the plurality of nozzles in the printing head;

a display unit having a display;

a detector configured to generate a residual vibration in the pressure chamber by imparting, to the actuator, a predetermined drive signal that prevents the nozzle from ejecting the ink, and, to perform, based on the residual vibration, defective nozzle detection processing of detecting a defective nozzle having ejection failure, for each of the plurality of nozzles; and a display control unit configured to display, in the display, defective nozzle information that includes a defective nozzle position indicating where a defective nozzle that has been detected by the detector is positioned in the printing head, and the nozzle number that is assigned to the defective nozzle.

2. The printing apparatus according to claim 1, wherein the printing head includes a plurality of the nozzle rows in which the plurality of nozzles are aligned, the plurality of nozzle rows respectively corresponding to inks of different colors, and the display control unit is configured to display, in the display, as the defective nozzle information, a pattern image representing a position of the nozzle that does not correspond to the defective nozzle, the nozzle number that is assigned to the defective nozzle, and the defective nozzle position using different printing results, the printing result corresponding to a position of each of the nozzles in each of the plurality of nozzle rows.

3. The printing apparatus according to claim 2, wherein the pattern image is an image representing the printing result of each of the plurality of nozzle rows using the color of the ink corresponding to each of the nozzle rows.

4. The printing apparatus according to claim 2, wherein the pattern image is an image representing a printing result of the nozzle row corresponding to the ink of a first color, of the plurality of nozzle rows, using a color different from the first color, and representing a printing result of each of the nozzle rows corresponding to the ink of a color other than the first color, of the plurality of nozzle rows, using the color of the ink corresponding to each of the nozzle rows.

5. The printing apparatus according to claim 1, wherein the printing head includes an achromatic color nozzle row in which a plurality of the nozzles for ejecting an achromatic color ink are aligned and a chromatic color nozzle row in which a plurality of the nozzles for ejecting a chromatic color ink are aligned, and when a monochrome printing mode is specified in which only the achromatic color ink is used, and the defective nozzle is present only in chromatic color nozzle row, the display control unit displays in the display an indication that it is not required to perform cleaning processing on the printing head.

6. The printing apparatus according to claim 1, wherein when the positions of the defective nozzles are consecutive in the printing head, the display control unit displays in the display an indication that cleaning processing on the printing head is recommended.

7. The printing apparatus according to claim 1, further comprising:

a storage unit configured to store a result of the defective nozzle detection processing performed by the detector in the past, wherein in response to a request from outside, the display control unit displays, in the display, as the defective nozzle information, the defective nozzle position in the past, based on the result of the defective nozzle detection processing in the past stored in the storage unit.

8. A display method performed by a printing apparatus including a printing head including a plurality of nozzles which are configured to eject an ink pushed out from a pressure chamber by driving of an actuator and to each of which a nozzle number that indicates an arrangement order of the plurality of nozzles is assigned in accordance with a position of each of the plurality of nozzles in the printing head, and the display method comprising:

generating a residual vibration in the pressure chamber by imparting, to the actuator, a predetermined drive signal that prevents the nozzle from ejecting the ink, and, performing, based on the residual vibration, defective nozzle detection processing of detecting a defective nozzle having ejection failure, for each of the plurality of nozzles; and displaying, in a display, defective nozzle information that includes a defective nozzle position indicating where a defective nozzle that has been detected is positioned in the printing head, and the nozzle number that is assigned to the defective nozzle.

9. A display system including a printing apparatus and a display device communicably coupled to each other, wherein the printing apparatus includes a printing head including a plurality of nozzles which are configured to eject an ink pushed out from a pressure chamber by driving of an actuator and to each of which a nozzle number that indicates an arrangement order of the plurality of nozzles is assigned in accordance with a position of each of the plurality of nozzles in the printing head, a detector configured to generate a residual vibration in the pressure chamber by imparting, to the actuator, a predetermined drive signal that prevents the nozzle from ejecting the ink, and, to perform, based on the residual vibration, defective nozzle detection processing of detecting a defective nozzle having ejection failure, for each of the plurality of nozzles, and a communication unit configured to transmit, to the display device, defective nozzle information that includes a defective nozzle position indicating where a defective nozzle that has been detected by the detector is positioned in the printing head, and the nozzle number that is assigned to the defective nozzle, and the display device displays the defective nozzle information received from the printing apparatus.

10. A printing apparatus comprising:

a printing head including a plurality of nozzles configured to eject an ink pushed out from a pressure chamber by driving of an actuator;

a display unit;

a detector configured to generate a residual vibration in the pressure chamber by imparting, to the actuator, a predetermined drive signal that prevents the nozzle from ejecting the ink, and, to perform, based on the residual vibration, defective nozzle detection processing of detecting a defective nozzle having ejection failure, for each of the plurality of nozzles; and a display control unit configured to cause the display unit to display defective nozzle information including a position, in the printing head, of the defective nozzle detected by the detector, wherein the printing head includes an achromatic color nozzle row in which a plurality of the nozzles for ejecting an achromatic color ink are aligned and a chromatic color nozzle row in which a plurality of the nozzles for ejecting a chromatic color ink are aligned, and when a monochrome printing mode is specified in which only the achromatic color ink is used, and the defective nozzle is present only in chromatic color nozzle row, the display control unit causes the display unit to indicate that the display unit is not required to perform cleaning processing on the printing head.

* * * * *